L. R. SPENCER.
ANTIFRICTION BEARING.
APPLICATION FILED OCT. 20, 1917.

1,262,124.

Patented Apr. 9, 1918.

Inventor
Louis R. Spencer
by Harry R. Williams
Attorney

UNITED STATES PATENT OFFICE.

LOUIS R. SPENCER, OF HARTFORD, CONNECTICUT.

ANTIFRICTION-BEARING.

1,262,124.

Specification of Letters Patent.  Patented Apr. 9, 1918.

Application filed October 20, 1917.  Serial No. 197,719.

*To all whom it may concern:*

Be it known that I, LOUIS R. SPENCER, a citizen of the United States, residing at Hartford, in the county of Hartford and State of Connecticut, have invented a new and useful Improvement in Antifriction-Bearings, of which the following is a specification.

This invention relates to those anti-friction bearings which have an outer member and an inner member with three rows of balls interspaced in such manner that the middle row of balls sustains the radial load while the outer row on one side resists longitudinal thrust in one direction and the outer row on the other side resists longitudinal thrust in the opposite direction, a bearing of this character being illustrated in Patent No. 1,240,382 granted to me September 18, 1917.

The object of the present invention is to so construct and arrange the parts of the bearing that while the balls of the middle row, which carry the radial load, are practically free to move a slight distance longitudinally of the axis of the bearing so that they will not be cramped as the bearing adjusts itself under sidewise thrusts, the several balls of the middle row are retained in relation to each other in such manner that each travels in its own path, and thus the wear of the radial load is distributed over a wider area, resulting in a longer life for the bearing, than if all of the balls of the middle row traveled in the same path.

Figure 1:
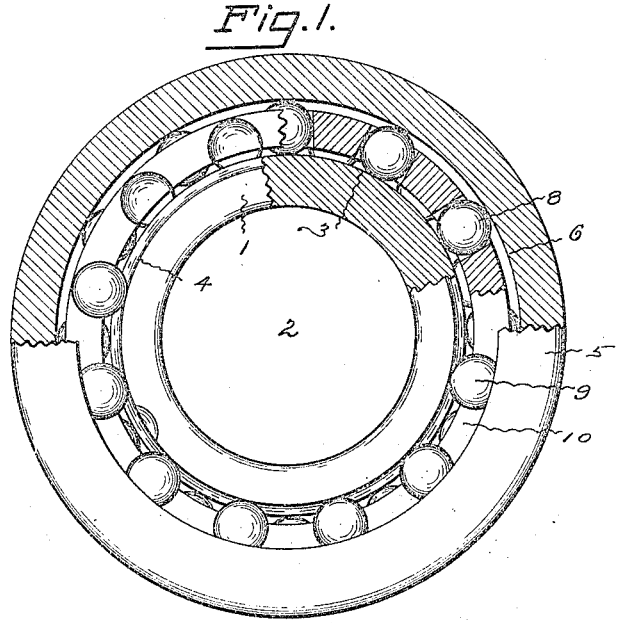
Figure 3:
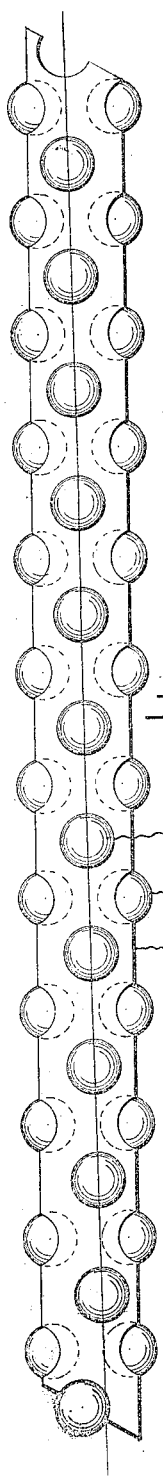
Figure 2:
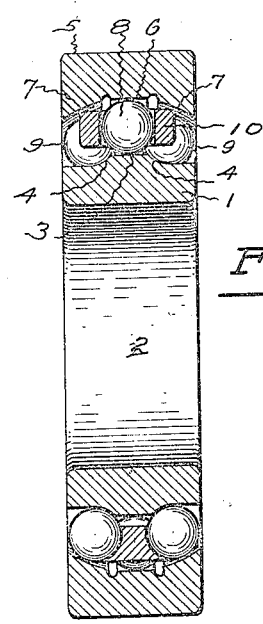

Of the accompanying drawings Figure 1 shows a side view, with portions broken away, of a bearing that embodies the present invention. Fig. 2 shows a diametric section of the same. Fig. 3 shows a developed view of the ball spacer and the three rows of balls retained thereby.

The inner member 1 is formed from a single piece of hard metal with a bore 2 of any standard diameter. On the exterior around the middle of the inner member is a cylindrical ball race 3 and on each side of the cylindrical ball race is a curved or conoidal ball race 4, these raceways being treated and ground in the usual manner to provide hard and smooth wearing surfaces.

The outer member 5 is formed from a single piece of hard metal having any standard dimensions. On the interior around the middle of the outer member is a cylindrical race 6 and on each side of the cylindrical race is a curved or concaved race 7, these raceways being treated and ground in the usual manner to provide hard and smooth wearing surfaces.

The balls 8 of the middle row fit between the cylindrical raceway on the exterior of the inner member and the cylindrical raceway on the interior of the outer member. This row of balls sustains the major portion of the radial load, and as they are located between the cylindrical raceways of the members the balls of this ring cannot be cramped or pinched by any sidewise movements of the members resulting from longitudinal thrusts brought upon the bearing that would tend to carry the balls sidewise in either direction. The balls 9 of the outer rows fit between the curved raceways on the exterior of the inner member and the curved raceways on the interior of the outer member. The curvature of the raceways is such that the outer balls resist sidewise thrusts on the members, and yet allow the members a slight rocking movement with relation to each other to compensate for any slight deflection of the parts from perfect axial alinement without cramping the balls.

The balls are retained properly spaced by a ring 10. This ring has pockets located so that the balls of the outer rows will be positioned opposite each other and the balls of the middle row will be intermediate the outer balls. The pockets for the balls of the middle row are formed so that their centers will not be in exactly the same transverse planes when the retaining ring is in place. By reason of this the balls of the middle row are retained in a slightly spiral formation between the members. This causes each of the middle balls to travel in its own path between the members, which path is different from the path of every other ball of the middle row. As a result of this the wear of the balls which sustain the radial load or main load is distributed over a wide surface and not in a single line. The ring is split and is formed in such manner that it can be twisted or sprung into the outer member. The middle balls may be located in the ring before or after it is put in place. After the balls of one outer row and the balls of the middle row have been put in the ring the inner member is placed in position and then the balls of the other outer row are inserted in the usual way.

The invention claimed is;

1. An anti-friction bearing comprising an inner annular member having on its exterior a cylindrical ball raceway around the middle and a conoidal ball raceway on each side of the middle, an outer annular member having on its interior a cylindrical ball raceway around the middle and a curved ball raceway on each side of the middle, a row of radial-load bearing-balls fitting between the cylindrical raceways of the inner and outer members, two rows of longitudinal-thrust bearing-balls fitting between the conoidal raceways on the inner member and the curved raceways in the outer member, and means loosely located between the parts for retaining the balls in relative position.

2. An anti-friction bearing comprising an inner annular member having on its exterior a cylindrical ball raceway around the middle and a conoidal ball raceway on each side of the middle, an outer annular member having on its interior a cylindrical ball raceway around the middle and a curved ball raceway on each side of the middle, a row of radial-load bearing-balls fitting between the cylindrical raceways of the inner and outer members, two rows of longitudinal-thrust bearing-balls fitting between the conoidal raceways on the inner member and the curved raceways in the outer member, and a pocketed retaining ring, the pockets in said ring retaining the middle row of balls in spiral formation between the cylindrical raceways of the inner and outer members.

LOUIS R. SPENCER.